United States Patent [19]

Rowe

[11] 4,438,630
[45] Mar. 27, 1984

[54] METHOD AND SYSTEM FOR MAINTAINING OPERATING TEMPERATURES IN A MOLTEN SALT CO-GENERATING UNIT

[75] Inventor: George H. Rowe, Windsor Locks, Conn.

[73] Assignee: Combustion Engineering, Inc., Windsor, Conn.

[21] Appl. No.: 415,511

[22] Filed: Sep. 7, 1982

[51] Int. Cl.³ .............................................. F01K 13/00
[52] U.S. Cl. ..................................... 60/676; 60/641.8; 60/652; 60/659
[58] Field of Search ................. 60/646, 652, 657, 659, 60/676, 641.8, 641.13, 641.14, 641.15; 126/436

[56] References Cited

U.S. PATENT DOCUMENTS 2,431,177 11/1947 Iager et al. ........................ 60/676 X
3,974,642 8/1976 Pacault ............................. 60/659 X
4,094,148 6/1978 Nelson ................................. 60/652

Primary Examiner—Allen M. Ostrager
Assistant Examiner—Stephen F. Husar
Attorney, Agent, or Firm—L. James Ristas

[57] ABSTRACT

A method of operating a co-generating steam supply system having two units, the second of which utilizes a molten-salt primary heat transfer fluid, is disclosed for utilizing the steam produced by the first unit for maintaining selected component operating temperatures in the second unit during periods when the second unit is not producing steam. The steam generator of the second unit is maintained at operating temperature by reversing the fluid flow through both the shell and tube sides. The reverse flow of molten salt is in heat exchange relation with the reverse flow of steam drawn from the steam flow line of the first unit.

2 Claims, 2 Drawing Figures

METHOD AND SYSTEM FOR MAINTAINING OPERATING TEMPERATURES IN A MOLTEN SALT CO-GENERATING UNIT

BACKGROUND OF THE INVENTION

This invention relates to large multi-unit steam generating systems, and in particular to systems in which one steam generating unit in the system is supplied with an intermittently heated flow of a molten salt heat transfer medium.

In recent years attention has been focusing on the use of renewable energy resources as a way of providing high quality energy, such as electricity or process steam from central generating stations. One such system is a co-generating power plant having a conventional fossil fuel unit partially repowered by a solar central receiver unit. Typically, molten salt is considered the ideal heat transfer medium for the solar unit.

Inherently, a molten salt solar receiving and steam generating unit is intermittent in operation. This type of unit requires a supplemental supply of thermal energy capable of maintaining undrained system components above the melting point of salt during inactive periods to avoid material degradation resulting from thermal cycling. Traditionally, a similar requirement in liquid metal systems has been fulfilled by the use of electrical trace heating. Conventional thinking for molten salt units appears to be following this precedent.

SUMMARY OF THE INVENTION

With respect to the above considerations, the present invention provides a substantial cost savings over conventional trace heating techniques. Heat for maintaining required temperature in the molten salt steam generating components is supplied from the conventional steam generating unit by flowing steam in reverse through the molten salt steam generator components.

The present invention is advantageously used in a molten salt co-generating steam supply system having first and second steam supply units wherein the first unit is adapted for continuous steam generation at alternating full system power and part system power. The second, preferably solar, unit is adapted for alternating hot shutdown and partial system power generation. A controller maintains normal system operation at continuous full rated power by periodically varying the contribution of the steam generation from the first and second units. The second unit has a closed primary loop containing a molten salt heat transfer fluid and a secondary loop containing water as the working fluid, with a heat exchanger interposed therebetween.

The invention contemplates a method and suitable apparatus for maintaining the second unit in a hot standby condition when steam is being generated only by the first unit. This is accomplished by connecting the first unit steam flow line to the second unit secondary loop steam line and connecting the first unit feed water flow line to the second unit secondary feed water flow line. Thus, a fraction of the steam generated by the first unit bypasses the load and enters the steam line of the secondary loop, flows in reverse direction through the steam generator components, and returns to the first unit through the secondary loop feed water line. The preferred embodiment includes the stop of reversing the direction of flow of the molten salt in the primary loop to maintain the steam generator at operating temperature.

BRIEF DESCRIPTION OF THE DRAWINGS

The following description of the preferred embodiment of the invention is made with reference to the accompanying drawings, in which.

DESCRIPTION OF THE PREFERRED EMBODIMENT

Figure 1:
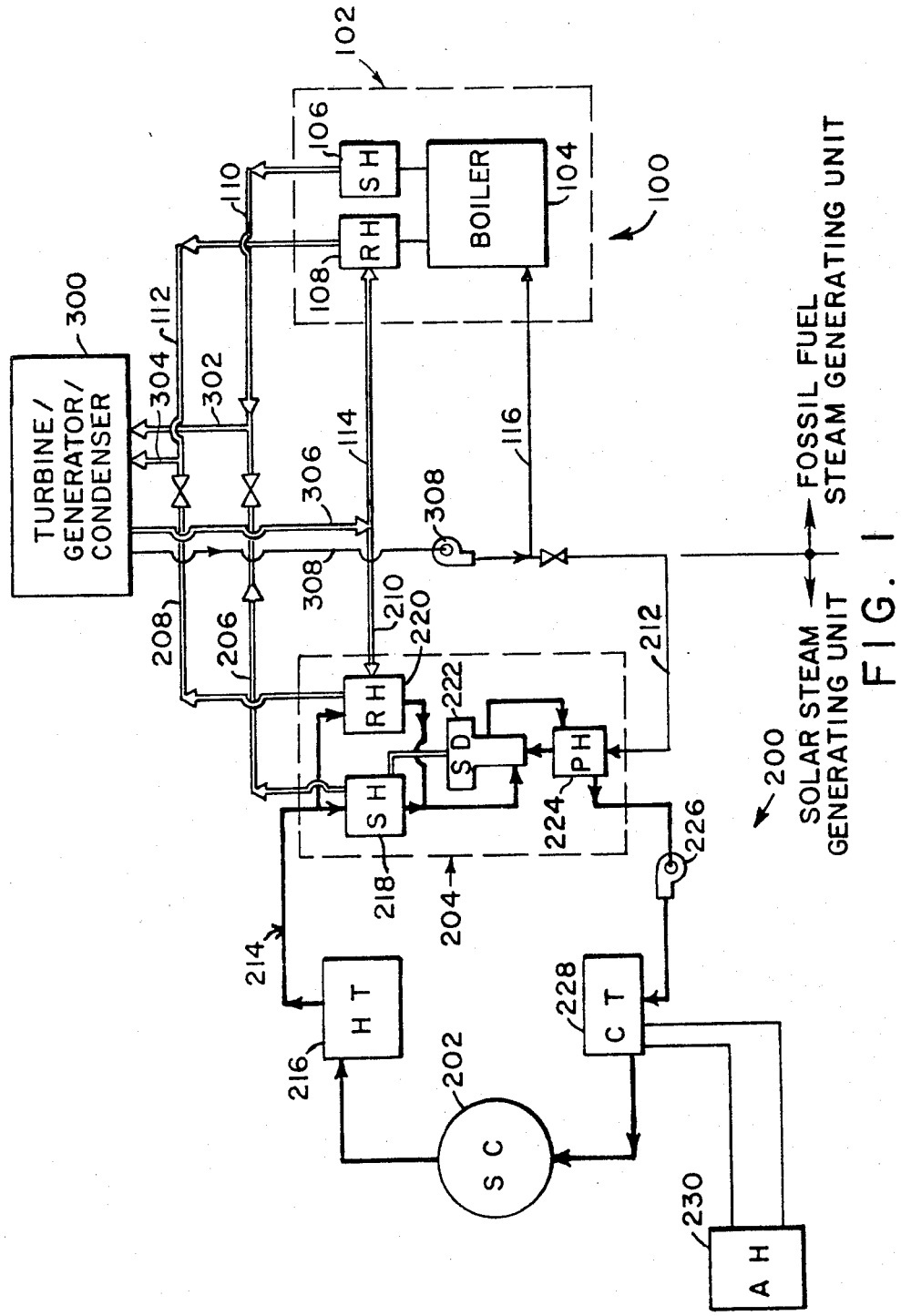
FIG. 1 is a schematic of a fossil fueled electric generating unit partially repowered by a solar central receiver unit connected to a common load such that both units are generating steam and electricity.

FIG. 1 shows a central station electric co-generating system in which the major contribution is from a first unit 100 adapted for continuous steam generation, such as a conventional fossil fuel steam generator 102. Typically, such unit would include a boiler 104, a superheater section 106 and a reheat section 108. The second unit 200 is adapted for alternating hot shutdown and partial system power generation, and in the preferred embodiment is a solar-powered unit having a solar central collector or receiver 202 and solar steam generator 204. The first and second units are shown connected to a common load, such as a turbine generator set 300 for producing electricity. Conventional control means for effecting changes in power generation contributions are not shown.

The fossil superheat steam line 110 and reheat steam line 112 discharge into the turbine generator through a system superheat steam line 302 and system reheat steam line 304, respectively. The second or solar unit 200 has corresponding solar unit superheat steam line 206 and reheat steam line 208 feeding into the system steam line 302 and system reheat line 304, respectively. The return lines from the turbine generator 300 include a system reheat feed line 306 that splits into a fossil reheat feed line 114 and a solar reheat feed line 210. A system feedwater line 308 returns from the condensor portion of the turbine generator set 300 and includes a feedwater pump 308 which returns feedwater through the fossil feedwater line 116 and solar feedwater line 212.

For the most efficient operation of the solar unit, an indirect cycle is preferred. The primary or salt loop 214 of the solar unit contains molten salt which is accumulated in a hot molten salt storage tank 216, preferably maintained at 1050° F., from which salt flows into the shell side of the solar or secondary steam generator 204. Typically the solar steam generator 204 includes solar unit superheater 218 and reheater 220 sections, a solar evaporator and steam drum 222 and a solar preheater 224. The hot molten salt flows in the indicated direction downward through the superheater 218, reheater 220, evaporator 222 and preheater 224, from which it is directed to a salt loop pump 226 which in turn discharges into a cold salt tank 228. The temperature drop of the salt between the hot tank 216 and the cold tank 228 is about 500° F. The salt or primary loop is preferably maintained at about 200 psi.

Conventionally, an auxiliary heat supply such as an oil or gas fired furnace 230 is used to maintain the cold tank 228 temperature at 550° F. under all circumstances including fully drained components. In the prior art trace heating elements (not shown) were conventionally deployed around the solar superheater 218, reheater 220, steam drum 222 and preheater 224, to be activated during the periods when, due to lack of sun for example, the hot tank temperature and therefore steam generator inlet temperature could not otherwise be maintained near the normal operating point. Preferably, the superheater 218 temperature should be maintained at about 850° F., and the evaporator steam drum 222 temperature at 600–700° F.

For ease of following the various fluid flow paths to be discussed below, the pipes lines that carry steam are indicated by double ink lines. Pipe lines that carry liquid water are indicated with single ink lines. Pipe lines that carry molten salt are indicated by thick ink lines. The arrowheads drawn on the ink lines indicate the direction of fluid flow therein.

During the co-generating mode of normal operation, each unit preferably supplies one half the rated system generating capacity. The molten salt passing through the various components of the solar steam generator 204 comes into heat exchange relationship with the feedwater entering the preheater 224, then evaporates and accumulates in the steam drum 222, from which the steam is superheated at 218. The superheated steam flows through the superheat steam line 206 and enters the system superheat steam line 302 along with the superheated steam 110 from the fossil unit. The solar reheat inlet line 210 contains saturated steam from an intermediate turbine stage of the turbine generator 300 and thus can be reheated by heat exchange with the molten salt in the solar unit reheater 220, before returning to the turbine generator through the reheat steam lines 208,304.

Figure 2:
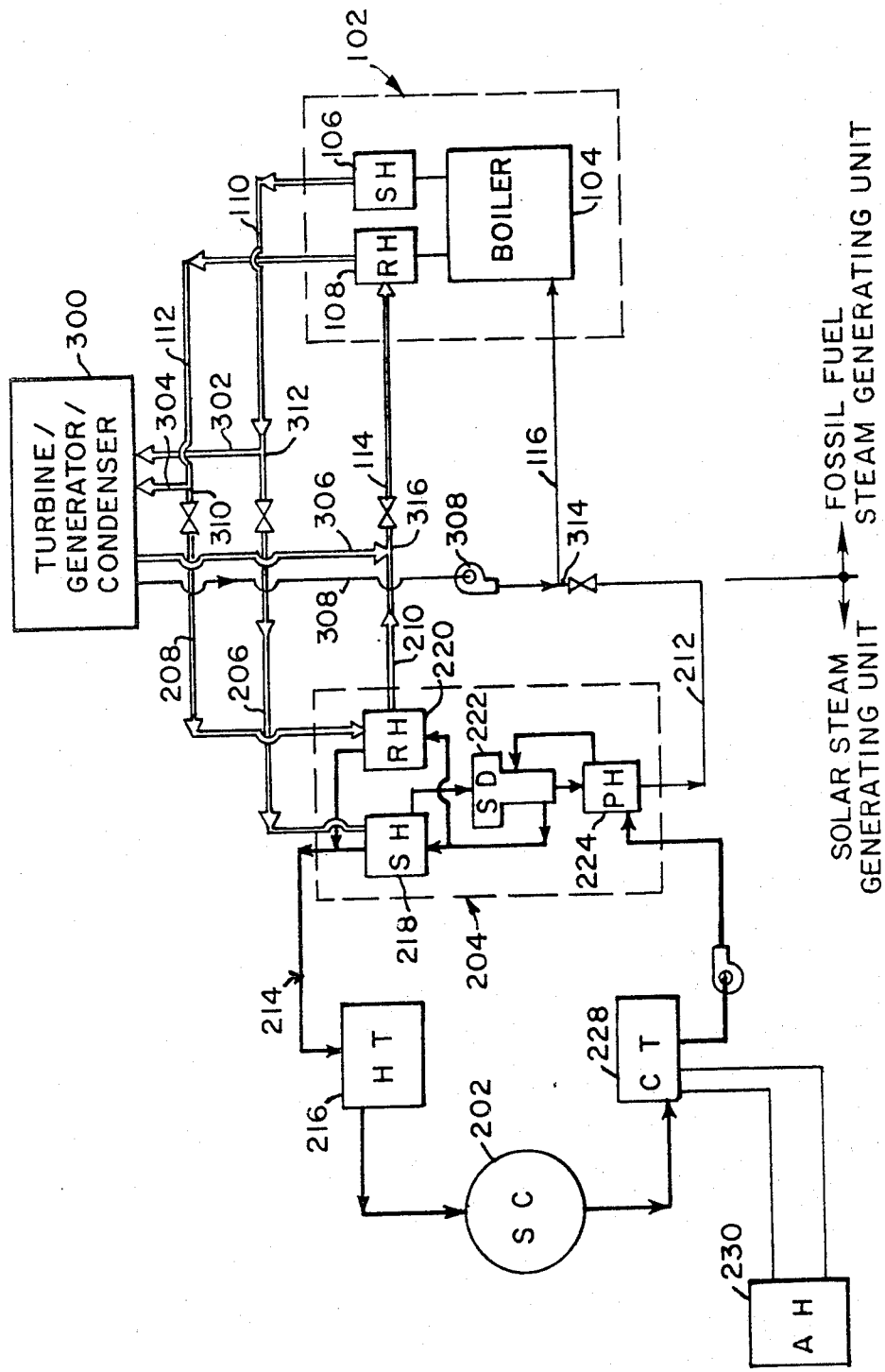
FIG. 2 is a schematic of the system shown in FIG. 1, showing the flow of steam and molten salt during a hot or sustained warm standby condition, or during diurnal shutdown over night.

Referring now to the invention as represented in FIG. 2, there is shown the preferred redirection of flow in selected steam and molten salt lines when a hot or sustained warm standby is required, or during diurnal shutdown overnight. The direction of salt flow in primary loop 214 is reversed, as shown by the reversed arrowheads. Also, the steam and feed-water flow lines are realigned so that a portion of the superheated steam flow 110 from the fossil steam generator 102 is introduced into the solar superheated steam line 206, and a portion of the reheated steam 112 from the fossil unit is likewise introduced into the solar reheat steam line 208. Thus, steam flow in the secondary loop of the solar steam generator 204 is reversed relative to its normal, power producing mode of operation.

The result of reversing both the salt flow and the water flow in the solar unit is to maintain a counterflow heat exchange relationship between the primary 214 and indirect or secondary solar loop such that the various solar steam generator components can be kept near the operating temperatures of the power generation mode. Although somewhat less than optimum temperatures are achieved, the invention can optionally be implemented by reversing only the steam line flow in the solar steam generator.

The invention also contemplates reversing the flow of steam through the solar steam generator when the system is in the cold shutdown mode and it is desired to start up the solar unit in the power generation mode. In this mode, the auxiliary heat supply 230 brings the molten salt temperature to just above the melting point, with the salt loop pump 226 providing flow in the normal direction, i.e., from the cold tank 228 towards the hot tank 216. To heat up the solar steam generators to their operating temperature (which is considerably above the salt melting temperature), the steam line and molten salt flow in the solar steam generator are reversed, as described above, such that a portion of the superheat and reheat steam from the fossil boiler is directed in reverse flow through the solar steam generator components.

The reversal of the flow direction of the molten salt can be accomplished by either reversing the rotation of the coolant pumps, or by providing through a valving arrangement (not shown) an alternate pump which can be brought into alignment when flow reversal is required. Likewise with the reverse steam flow, valve arrangements indicated near junctions 310,312,314, and 316 can be provided to effect the required reverse flow in the solar superheat and reheat steam lines.

The present invention can thus be used during cold startup, for hot or sustained warm standby, or during diurnal shutdown overnight. Also, during normal daytime operation, if the solar unit hot molten salt supply is interrupted, as for example, by a system malfunction or by exhaustion of the hot molten salt in storage, the solar system generator component temperatures can be maintained in accordance with the present invention.

It may be appreciated that the foregoing method and associated apparatus to continuously maintain operating temperatures for the molten salt steam generating components offers the possibility of eliminating much of the supplementary equipment and related problems conventionally associated with co-generating systems of this type. The cost for installing, maintaining and operating electrical trace heating elements can be eliminated. Furthermore, the use of electrical trace heating for cold startup, and hot or sustained warm standby can be avoided. Also, the severe thermal cycling of the solar steam generator components during diurnal startup and shutdown are minimized, because the components are maintained near their normal operating temperatures. This is a very important consideration in that thermal cycling of materials suitable for use with molten salt steam generators is a significant limitation on the lifetime performance. Consistent with conventional central generating stations, a co-generating system of the foregoing type should have a lifetime of at least thirty years without the need to replace major components. Finally, equipment of sub-systems adapted for storage of molten salt at high temperatures, as a means of minimizing the need to reheat the salt, can be minimized or eliminated.

I claim:

1. In a molten salt co-generating steam supply system, the system including first and second steam supply units connected to a common load, the first unit adapted for continuous steam generation in alternating full system power and part system power output, the second unit adapted for alternating hot shutdown and partial system power generation, the first unit having a steam flow line to the load and a feed-water flow line from the load, the second unit having a primary fluid loop containing a molten salt and a secondary loop containing water as the working fluid, with a steam generating heat exchanger interposed therebetween, wherein the invention is a method of maintaining the steam generator components of the second unit in a hot standby condition when steam is being generated only by the first unit, comprising the steps of:

connecting the first unit steam flow lines to the second unit secondary loop steam flow lines;

connecting the first unit feed-water flow lines to the second unit secondary feed-water flow lines;

whereby a fraction of the steam generated by the first unit bypasses the load and enters the steam line of the secondary loop, flows in reverse direction through the secondary steam generator and returns to the first unit through the secondary loop feed-water lines, such that the steam generator components are maintained near their normal operating temperatures.

2. The method of claim 1 further comprising the step of reversing the direction of flow of the molten salt in the primary loop.

* * * * *